United States Patent [19]
Mandyam

[11] Patent Number: 6,167,273
[45] Date of Patent: Dec. 26, 2000

[54] APPARATUS, AND ASSOCIATED METHOD, FOR EFFECTUATING POWER CONTROL TO MAINTAIN DESIRED QOS LEVELS IN THE PERFORMANCE OF A COMMUNICATION SERVICE

[75] Inventor: Giridhar D. Mandyam, Dallas, Tex.

[73] Assignee: Nokia Mobile Phones Ltd., Espoo, Finland

[21] Appl. No.: 09/301,035

[22] Filed: Apr. 28, 1999

[51] Int. Cl.[7] .................................................. H04B 7/00

[52] U.S. Cl. ........................ 455/450; 455/522; 455/62; 455/63; 455/69; 455/127; 370/332

[58] Field of Search .................................. 455/434, 435, 455/450, 452, 509, 510, 516, 522, 62, 63, 69, 103, 115, 126, 127; 370/329, 332, 333, 335

[56] References Cited

U.S. PATENT DOCUMENTS

| | | | |
|---|---|---|---|
| 5,491,837 | 2/1996 | Haartsen | 455/62 |
| 5,604,730 | 2/1997 | Tiedemann, Jr. | 455/69 |
| 5,638,412 | 6/1997 | Blakeney, II et al. | 455/69 |
| 5,722,051 | 2/1998 | Agrawal et al. | 455/69 |
| 5,732,077 | 3/1998 | Whitehead | 455/69 |
| 6,047,189 | 4/2000 | Yun et al. | 455/522 |

*Primary Examiner*—Reinhard J. Eisenzopf
*Assistant Examiner*—Lester G. Kincaid
*Attorney, Agent, or Firm*—Robert H. Kelly; Holland & Hart LLP

[57] ABSTRACT

Apparatus, and an associated method, for initiating gain control in a radio communication system. Determinations are made as to a required range of gains at which gain elements of a transmitter must be operated to ensure that a communication service is performed at a selected QoS level. The range of channel gains is sent pursuant to service negotiations as part of an offered gain message. Gain control is effectuated therefrom.

25 Claims, 7 Drawing Sheets

APPARATUS, AND ASSOCIATED METHOD, FOR EFFECTUATING POWER CONTROL TO MAINTAIN DESIRED QOS LEVELS IN THE PERFORMANCE OF A COMMUNICATION SERVICE

FIELD OF THE INVENTION

The present invention relates generally to performance of a communication service at a desired QoS (quality of service) level in a cellular, or other radio, communication system. More particularly, the present invention relates to apparatus, and an associated method, to effectuate power control in the radio communication system to ensure the performance of the communication service at the desired QoS level. Appropriate gain levels by which to amplify signals to be transmitted to effectuate the communication system at the desired QoS level are determined and requested pursuant to service request negotiations in the form of an offered gain request by a transmitting station.

BACKGROUND OF THE INVENTION

A communication system permits the communication of information between two or more communication stations. The communication stations are connected by a communication channel upon which a communication signal is transmitted. The communication signal includes the information which is to be communicated between the communication stations. In a two-way communication system, a communication station includes both a transmitter portion and a receiver portion operable to transmit and to receive, respectively, communication signals.

A radio communication system is a communication system in which the communication channel formed between the communication stations is a radio channel defined upon a portion of the electromagnetic spectrum. When a communication station operable in such a communication system includes both a transmitter portion and a receiver portion, the communication station forms a radio transceiver, capable of two-way, radio communication with another communication station. Because communication signals can be transmitted between radio transceivers on radio channels, wire line connections are not required to effectuate communications in a radio communication system. Thereby, communications are possible by way of a radio communication system when formation of a wire line connection between the communication stations would be impractical.

A cellular communication system is an exemplary radio communication system. Cellular communication systems, constructed according to various standards, have been installed throughout significant portions of the world. A subscriber to a cellular communication system is able to communicate telephonically by way of a radio transceiver, typically referred to as a mobile station, when the mobile station is positioned within an area encompassed by the communication system. Telephonic communication of both voice information and data information is permitted in such networks.

Advancements in digital communication techniques have facilitated the implementation of new cellular, and other, communication systems capable of communicating increased amounts, and types, of data. For instance, a proposed cellular communication system set forth in the specification of a CDMA2000 standard provides for the performance of multi-media communication services. Multi-media communications pertain, generally, to the communication of two, or more, separate types of information, such as voice and data information.

QoS (quality of service) level parameters are defined in the specification of the proposed CDMA2000 standard. QoS level parameters are analogously also defined in standards pertaining to other cellular communication systems. QoS level parameters define standards by which to measure, or ensure, minimum communication quality levels. A QoS level parameter can be used in service initiation and service modification. A QoS level parameter can be used during service negotiations in the initiation of performance of a communication service as well as to modify service levels during performance of a communication service. A QoS level parameter defines a communication service in terms, e.g., bit-error rates, service delays, as well as other types of performance measures. Performance of a communication service at a level at least corresponding to a selected performance measure by which a QoS level parameter is defined ensures that the communication service is performed at a communication quality level associated therewith. The QoS level parameter, therefore, is a quantifiable parameter associated with a communication quality level.

Different communication services might necessitate different levels of communication qualities to ensure their performance. And, different subscribers to a communication system might be willing to subscribe to different levels of service. For instance, one subscriber might require that a communication service be performed at a greater data transmission rate than another subscriber. A subscription for service at a QoS level ensuring performance of the communication service at the greater transmission rate can be selected to meet the requirements of the subscriber.

The amount of gain applied to a communication signal at a transmitter portion of a communication station is, in part, determinative of a performance measure associated with a QoS level parameter. To ensure that a communication service is performed at a selected QoS level, the gain by which the communication signal transmitted to perform such communication service must be selected to be at least great enough to perform the communication service at the desired QoS level. However, the level of gain at which a communication signal is transmitted in a CDMA (code-division multiple-access) communication system cannot merely be increased without constraint. A communication signal of an inordinately high level of gain interferes with concurrently-generated communication signals by other communication stations operable in the CDMA communication system. Permitted levels of gain by which a communication station can amplify a communication signal must therefore be controlled. In the proposed CDMA2000 communication system, the gain is selected pursuant to service negotiation. That is to say, control apparatus of the proposed CDMA2000 system controls whether a request to perform a communication service at a desired QoS level shall be permitted.

While channel gains associated with dedicated data channels are defined in CDMA2000 standard proposals, a manner by which to use feedback power control to adjust the levels of gain has not been set forth. A manner by which to effectuate power control by which to control the levels of gain by which communication signals are amplified would advantageously improve system efficiency.

It is in light of this background information related to communications in a radio communication system that the significant improvements of the present invention have evolved.

SUMMARY OF THE INVENTION

The present invention, accordingly, advantageously provides an apparatus, and an associated method, by which at least to initiate effectuation of power control at a radio transceiver. Effectuation of power control ensures that appropriate QoS (quality of service) levels are maintained pursuant to performance of a communication service.

Determinations are made of a range of gain levels by which communication signals must be amplified to ensure performance of a communication service, such as performance of a multi-media application, at a selected QoS level. During service negotiation procedures in which service is requested to perform the communication service, indications of the range of gain levels are used in the determination of whether to grant permission to perform the communication service and to allocate appropriate levels of communication system resources to perform the communication service.

In one implementation, the range of gain levels by which signals to be transmitted on various channels by a mobile station are determined at the mobile station, either by calculations performed at the mobile station, or by external inputs thereto, such as by way of a user interface. Indications of the range of gain levels is transmitted to network infrastructure of the communication system subsequent to a channel request message sent to the network infrastructure. In one implementation, the message transmitted to the network infrastructure forms part of an offered gain request, sent to the network infrastructure during service negotiations subsequent to transmission of the channel request.

In a further implementation, determinations are made at the network infrastructure to determine whether to grant access to the mobile station to the communication system to perform the communication service therethrough. When service is granted, system resources are allocated to permit the performance of the communication service. Signals generated by the network infrastructure and transmitted to the mobile station control the levels of gain by which the communication signals generated by the mobile station are amplified.

In one implementation, closed-loop gain control is effectuated and the network infrastructure transmits to the mobile station channel gain messages to adjust channel gain, as appropriate, during performance of the communication service.

In another implementation, the mobile station is instructed in manners by which to operate responsive to the network infrastructure transmission of NAK (no acknowledgement) indications responsive to generation by the mobile station of RLP (radio link protocol) data frames, formatted in conventional manner of the RLP. The mobile station is provided, either as a user-specific message, or as a system parameter, an NAK interval, an NAK limit, and a QoS step value. Responsive to such values, the mobile station determines in what manner to adjust levels of gain of amplifier circuitry of the mobile station. For instance, the mobile station counts NAK indications during the interval defined by the NAK interval value, and, when the count exceeds the NAK limit value, the level of gain is stepped, up or down, according to the step size of the QoS step value.

A manner is thereby provided by which to ensure that the gain levels at which communication signals are generated to perform a communication service are great enough to perform the communication service at a selected QoS level. If, during performance of the communication service, signal conditions warrant a reduction in the gain level, the gain levels are appropriately altered. Thereby, system capacity can be better utilized.

In these and other aspects, therefore, the present invention provides apparatus, and an associated method, for initiating effectuation of power control of signals generated by a radio device operable in a communication system to perform a communication service. Signals generated by the radio device are transmitted upon a radio channel to a receiving station to perform the communication service. A channel gain range determiner is coupled at least to receive indications of the communication service to be performed by the radio device. The channel gain range determiner determines a range of channel gains within which signal levels of the signals generated by the radio device permit performance of the communication service. A message generator is coupled to receive determinations of the channel gain range determiner. The message generator generates a message for transmission to the receiving station requesting allocation of channel capacity upon the radio channel to transmit signals upon the radio channel to perform the communication service.

A more complete appreciation of the present invention and to the scope thereof can be obtained from the accompanying drawings which are briefly summarized below, the following detailed description of the presently-preferred embodiments of the present invention, and the appended Claims.

DETAILED DESCRIPTION OF THE PREFERRED EMBODIMENT

Figure 1:
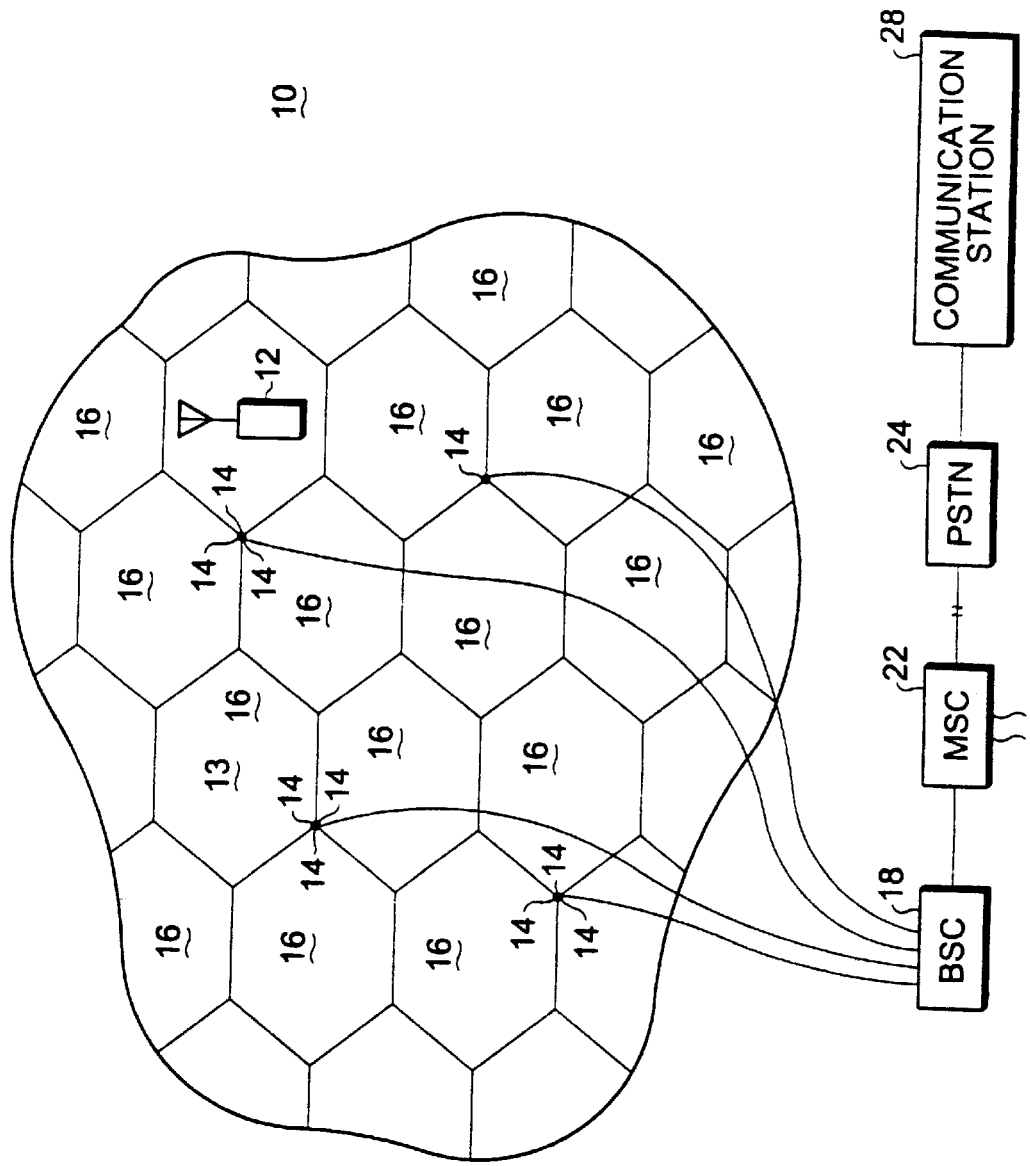
FIG. 1 illustrates a representation of a portion of a cellular communication system in which an embodiment of the present invention is operable.

Referring first to FIG. 1, a portion of a cellular communication system, shown generally at 10, is installed throughout a geographical area. The network infrastructure of the cellular communication system provides for wireless communications with mobile stations, of which an exemplary mobile station 12 is shown in the Figure.

The system 10 includes a plurality of spaced-apart radio base stations 14 which are positioned at spaced locations throughout the geographical area to be encompassed by the communication system. In the implementation shown in the figure, sets of three radio base stations are co-located. Each base station 14 defines a cell, and the cells 16 together collectively cover the area encompassed by the communication system. In the exemplary implementation in which sets of three base stations are co-located, each radio base station defines a sector cell in conventional manner.

Groups of the radio base stations 14 are coupled to a BSC (base station controller) 18. A BSC is operable to control operation of radio base stations coupled thereto. Groups of BSCs 18, in turn, are coupled to an MSC (mobile switching center) 22. An MSC is operable, amongst other things, to perform switching operations. The MSC is coupled to a PSTN (public-switched telephonic network) 24. And, the PSTN is coupled to communication stations, such as the communication station 28.

The apparatus forming the network infrastructure, its operation, and the operation of the mobile stations 12 operable therein, conform with a cellular standard. An exemplary implementation of an embodiment of the present invention shall be described with respect to a proposed CDMA2000 cellular standard proposed as a 3G (third generation) cellular communication system standard. It should be understood, however, that in alternative implementations, an embodiment of the present invention is similarly operable in other types of cellular, as well as other radio, communication systems.

Various types of communication services are proposed to be provided for in a CDMA2000 cellular communication system. Multi-media communication services, for instance, are provided for in such a system. QoS (quality of service) level parameters are also defined in the proposed CDMA2000 system. QoS level parameters are representative of performance measures of communication of signals in the communication system. Performance measures include, for instance, target bit rates, bit-error rates (BERs), service delays or any of various other parameters. When communication services are performed at a particular QoS level, the communication service is effectuated at a quality level at least as good as the performance measures associated with the QoS level. Proposals have been made to permit subscribers to the communication system to subscribe for service at a particular QoS level for a particular subscription rate. The subscription rate would, for instance, be related to the QoS level pursuant to which subscription is made. And, subscription could be made for different levels of QoS for different services. That is to say, subscription could be made for voice service at a first QoS level, and a different QoS level for a type of data service.

The following description shall be described with respect to a QoS level which is defined in terms of minimum BER (bit error rate) performance. BER is measured in terms of any of various terms. For instance, BER can be measured in terms of a physical layer BER, an effective BER due to automatic repeat requests (ARQ) schemes, or effective receive $E_b/N_o$ for a particular service. By maintaining a target received $E_b/N_o$ using power control as described below, an effective BER may be maintained using existing ARQ protocols.

Figure 2:
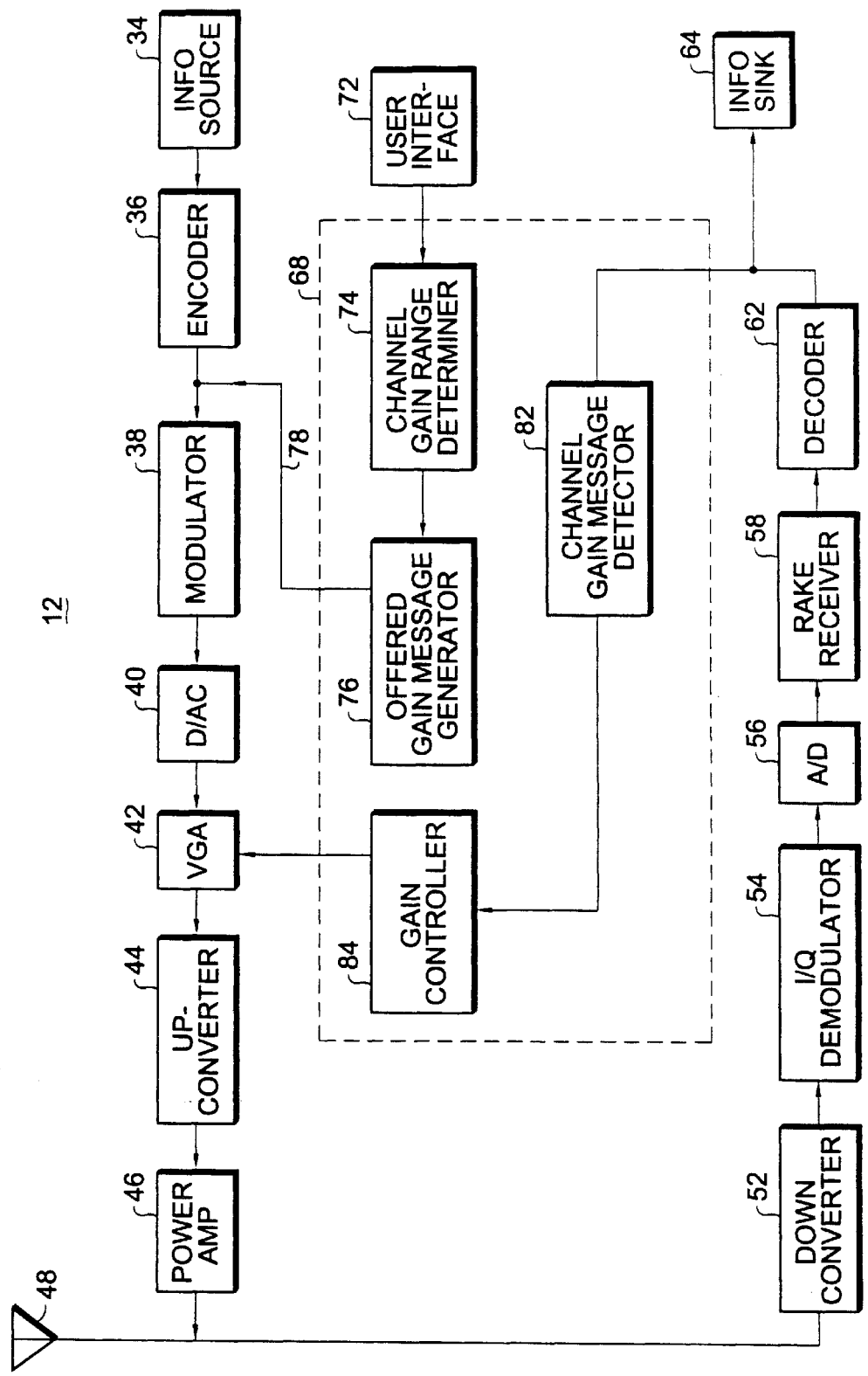
FIG. 2 illustrates a functional block diagram of a mobile station operable pursuant to an embodiment of the present invention.

FIG. 2 illustrates a mobile station 12 operable pursuant to an embodiment of the present invention. The mobile station 12 receives forward-link signals transmitted thereto by a radio base station and generates reverse-link signals for transmission to a radio base station. Two-way communication is thereby effectuated by way of the mobile station to perform communication services, such as multi-media applications.

The mobile station 12 includes a transmit portion having an information source 34 at which information to be transmitted is generated. The information is provided to an encoder 36 which is operable to encode the information provided thereto according to an encoding scheme. The encoder provides encoded signals to a modulator 38 which is operable to modulate the encoded signals provided thereto and to provide modulated signals, once converted into analog form by a digital-to-analog converter (DAC) 40, to a VGA (variable gain amplifier) 42. The VGA is operable to amplify the modulated signals provided thereto at a selected level of gain and to provide amplified signals to an up-converter 44. The up-converter is operable to up-convert in frequency the signals provided thereto to be of a transmission frequency. Up-converted signals generated by the up-converter 44 are then amplified by a power amplifier 46. The amplified signals are then applied to an antenna transducer 48 to be transduced thereat into electromagnetic form.

The receive portion of the mobile station includes a down-converter 52 coupled to the antenna transducer 48. Forward-link signals detected by the antenna transducer 48 are converted into electrical form and provided to the down-converter. The down-converter is operable to down-convert in frequency the signal provided thereto and to provide down-converted to an I/Q demodulator 54. The demodulator generates the demodulated signals which are provided to an A/D (analog-to-digital) converter 56 to convert the signals into digital form. Digitized signals are provided to a rake receiver 58 which detects multi-path representations of the same symbols and combines such detected symbols. The signals formed by the rake receiver 58 are provided to a decoder 62 which decodes the signals into decoded form and provides such decoded signals to an information sink 64.

The mobile station 12 further includes a controller 68 operable pursuant to an embodiment of the present invention. In addition to conventional control functions performed by control circuitry of the mobile station, the controller 68 is here also operable to initiate and to effectuate gain control to ensure that communications services performed by the mobile station are effectuated at an appropriate QoS level. With respect to a QoS level parameter of a BER, the level of gain at which a signal is amplified is related to the related BER of the transmitted signals. Various elements of the controller are shown as functional blocks. When the controller is implemented as a processing device having algorithms executable therein, various functions performed by various of the functional blocks are effectuated by algorithms executed by the processing device.

The controller 68 is coupled to a user interface 72 to receive user-generated inputs. Inputs generated by way of the user interface are provided, amongst other places, to a channel gain range determiner 74 which functionally forms a portion of the controller. Here, the determiner is coupled to receive indications of a communication service which is to be performed by the mobile station. The channel gain range determiner is operable to determine a range of channel gains within which communication signals generated pursuant to a communication service must be amplified to ensure that an appropriate level of QoS is maintained during effectuation of the communication service. The range of channel gains includes a lower boundary value of a channel gain value beneath which maintenance of a selected QoS cannot be ensured.

While various factors are determinative of the lower boundary value, including levels of network loading and service rate negotiations, the architecture, viz., the components, of the mobile station form critical factors as the architecture of the base band components of a mobile station typically supports only a limited dynamic range of signal values. For instance, a digital to analog converter, such as the DAC 40 shown in the Figure, is of a limited dynamic range. Due to pulse shaping and emission requirements, signals applied to the DAC 40 must be scaled to "fit" the various channels, i.e., signals, into the dynamic range of the DAC. Truncation of signals may also be employed, however, with a resultant spectral distortion. The RF front-end of a mobile station is also sometimes a critical factor in the level of achievable $E_b/N_o$ for a particular channel. An analysis of whether the mobile can meet its emissions and wave form quality requirements given a particular bearer service profile is based, for instance, upon the number of bits assigned by a mobile station to a particular channel to implement the channel gain. The quantity of the number of bits assigned to a particular channel may include implementation of a pulse-shaping filter. Assuming that a mobile, during a particular instance in time, assigns a maximum of B bits to a particular channel the effective SNR (signal-to-noise ratio) of the channel due to quantization error can range anywhere from very low to a maximum achievable SNR using B bits. Although B bits have been allocated by the mobile to a particular physical channel, there is an effective range of SNR in practice as the mobile station may allocate less than this number at any time due to QoS constraints.

Assuming that the quantization noise variants may be represented as $\sigma_q^2$, such noise can be treated as an additional source of white noise. If the power at a base station receiver is $I_{orx}I_{oc}$, and the processing gain is $P_g$ and the individual physical channel chip-to-power ratio is designated as CHAN $E_c/I_{or}$, then the effective $E_b/N_o$ is represented as:

$$\frac{E_b}{N_0} = \frac{(CHAN\ E_c/I_{or})P_g I_{orx}/I_{oc}}{1+\sigma_q^2}$$

By defining a received pilot $E_b/N_o$ as $(E_b/N_o)_{PI}$, the value can be represented in terms of $G_{chan}$ as follows:

$$\frac{E_b}{N_o} = \frac{E_b}{N_{oPI}} G_{chan}^2 \frac{1}{1+\sigma_q^2}$$

A typical DAC, such as the DAC 40, utilized by mobile stations is preferably operated by providing uniformly-spaced, output voltage levels according to uniformly-spaced input levels based upon the number of bits driving the DAC. Analysis of the quantization noise can be made by modeling the data flowing over a physical channel, after spreading impulse shaping, to be Gaussian. An effective QoS range offered by the mobile station is determined in terms of deviation from $E_b/N_o$ on a pilot channel. For instance, the minimum normalized quantization noise variance for a Gaussian random process is 0.3634, 0.1188, 0.03744, and 0.01154 for 1, 2, 3 and 4 bits, respectively, of a uniform quantizer. The corresponding deviation from $G_{chan}$-adjusted $E_b/N_o$ is 1.346, 0.487, 0.159, and 0.049 dB respectively. Assuming that at least three bits are allocated to a particular channel, then the quantization noise degradation is less than 0.2 dB. An acceptable range for $G_{chan}$ is obtained such that the QoS range is maximized under the constraints of the DAC. In a pedagogical, two-channel example, tradeoffs are shown to be evident in the determination of the acceptable range. A pilot channel and another channel designated as C, forming a fundamental, supplemental, or control channel, are the two channels of the exemplary two-channel example. Assuming that the DAC has D bits of useable linear range and that the pilot channel has allocated P bits by the mobile station, that the minimum number of bits allocated by the mobile station to the channel C is $C_b$ and $C_b$ is less than D and P is less than $C_b$, then the following equation applies:

$$G_c < \frac{2^{D-1}-2^{P-1}}{2^{C_b-1}}$$

In the above equation, when D=8, P=3, and $C_b$=5, the maximum value of $G_c$ is 7.75. Therefore, as much as 17.78 dB of gain may be added to the channel C over the minimum gain.

The aforementioned manner of determining channel gain is exemplary, and, in other implementations, the channel gain range is determined in other manners. Indications of the channel gain range determined by the determiner 74 are provided to an offered gain message generator 76. The offered gain message generator is operable to generate an offered gain message including information of the determinations made by the channel gain range determiner 74. Messages generated by the generator are provided by way a line 78 which is connected to the transmit portion of the mobile station. In conventional manner, the message is interleaved or otherwise formatted in a selected manner and then modulated by the modulator 38. The offered gain message is transmitted by the mobile station during service negotiations by which mobile station requests service, that is, allocation of a supplemental channel, to perform a communication service. The network infrastructure decides whether to grant service to the mobile station and to allocate the appropriate amount of channel resources to permit effectuation of the communication service at the selected QoS level.

When the network infrastructure grants service to the mobile station to perform the communication service, a service grant message is broadcast as a forward-link signal which is detected by the antenna transducer 48 and processed by the receive portion of the mobile station. A channel gain message is also broadcast by the network infrastructure indicating to the mobile station at what gain level signals generated by the mobile station are to be amplified to perform the communication service. A channel gain message detector 82 is coupled to the receive portion of the mobile station. The detector 82 is operable to detect indications of the channel gain message received at the mobile station 12 and processed by the receive portion thereof.

Indications detected by the channel gain message detector 82 are provided to a gain controller 84. The gain controller is operable to control the amplification levels at which the VGA 42 amplifies signals applied thereto. Thereby, close-loop gain control is effectuated to control the gain levels at which signals are generated at the mobile station to perform a communication service while ensuring that an appropriate level of QoS is maintained.

Figure 3:
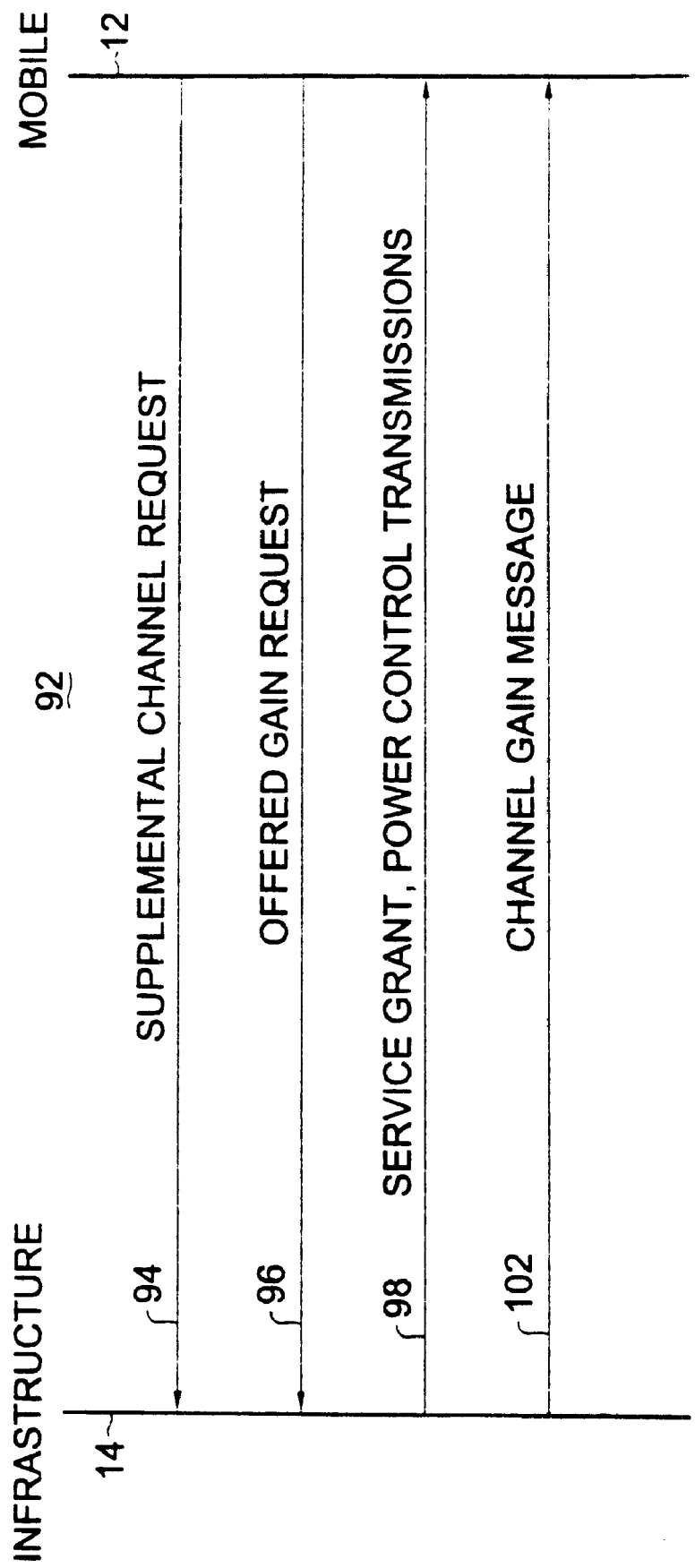
FIG. 3 illustrates a sequence diagram illustrating the signal sequences generated during operation of an embodiment of the present invention.

FIG. 3 illustrates a sequence diagram, shown generally at 92, which illustrates the signaling between the mobile station 12 and the network infrastructure, including a radio base station 14, during operation of an embodiment of the present invention. When a communication service is to be performed by a mobile station, resources of the communication system must be allocated to the mobile station to permit the effectuation of the communication service. First, a supplemental channel request, indicated by the line 94, is generated by the mobile station and transmitted to the network infrastructure. The supplemental channel request is a request for the network infrastructure to allocate to the mobile station channel resources so that the communication service can be effectuated. Then, as indicated by the line 96, an offered gain message generated by the generator 76, shown in FIG. 2, is generated by the mobile station and transmitted to the network infrastructure. As described above, the offered gain message includes indications of a range of channel gains required to ensure that the communication service can be effectuated at a selected QoS level.

The network infrastructure grants service to the mobile station to perform the communication service by issuing a service grant, indicated by the line 98. The service grants includes power control transmissions to select an initial level of gain by which the communication signals generated by the mobile station are to be amplified. And, during performance of the communication service, a channel gain message, indicated by the line 102, is transmitted by the network infrastructure to the mobile station to adjust the mobile's supplemental channel power levels. That is to say, the channel gain message indicates at what level of gain signals should be amplified at the mobile station.

Figure 4:
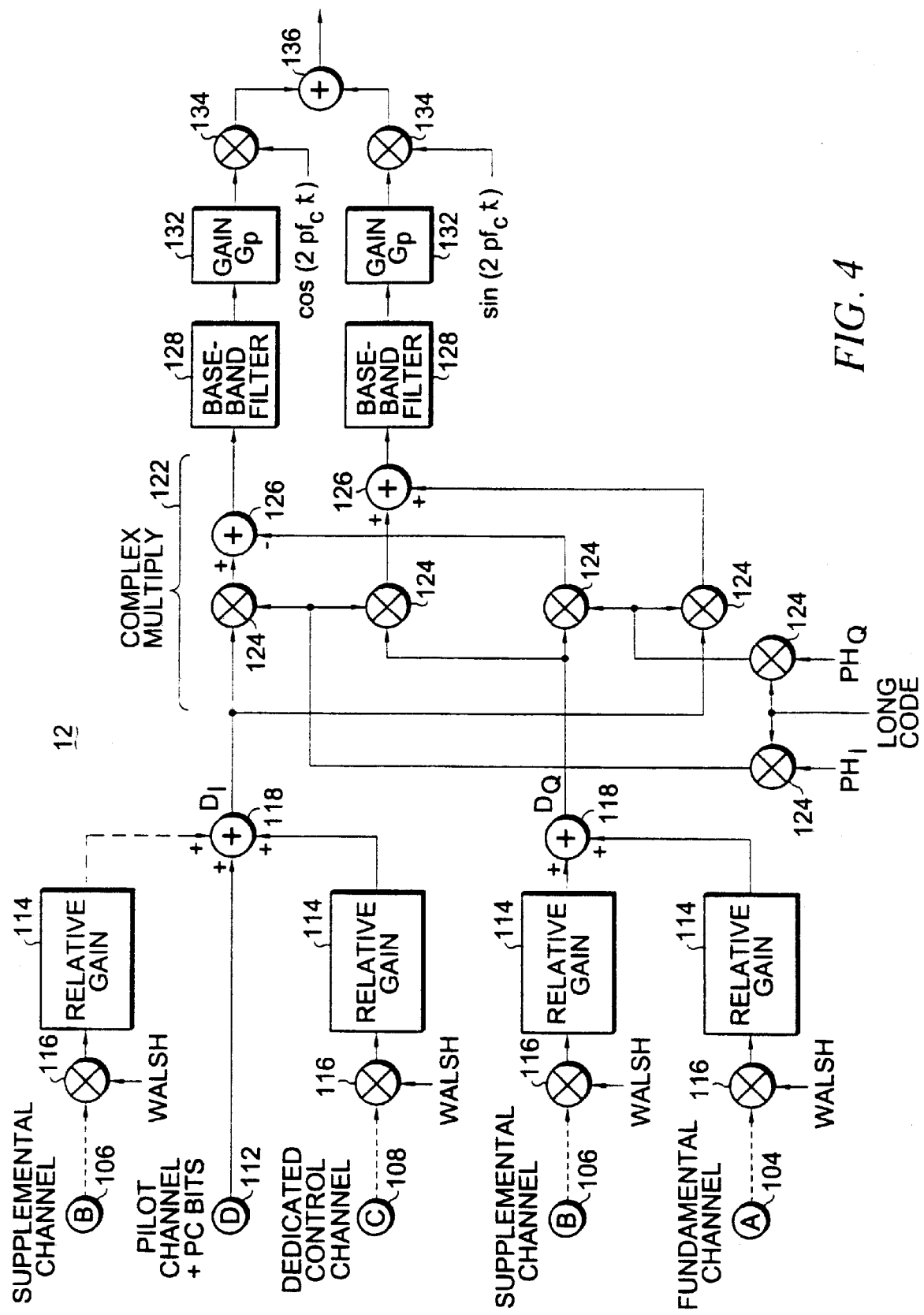
FIG. 4 illustrates a functional block diagram of a portion of the mobile station shown in FIG. 2.

FIG. 4 illustrates the reverse-link channel structure which forms a portion of mobile station 12. The reverse-link channel structure shown in the Figure is exemplary of the structure of portions of the receive portion of the mobile station constructed according to the proposals set forth in the proposed CDMA2000 standards proposal. A plurality of channels are provided, here shown to include a fundamental channel 104, supplemental channels 106, a dedicated control channel 108, and a pilot channel 112. Gain elements 114 are associated with the channels 104–108. Walsh coding is performed by providing Walsh codes to the mixers 116 which are utilized to form Walsh-encoded sequences. The Walsh-encoded sequences are amplified by the gain elements 114. The levels of gain at which individual ones of the gain elements amplify the signals applied thereto are controlled in manners as described above with respect to FIG. 2 or, alternately, as shall be described below with respect to FIG. 6.

The illustrated portion of the mobile station is further shown to include summing elements 118 as well as a complex multiply section 122 including a plurality of mixers 124 and summing elements 126. Base band filters 128, additional gain elements 132, mixers 134 and a summer 136 are further shown in the Figure. Additional details related to the reverse-link channel structure shown in FIG. 6 can be found in appropriate portions of the CDMA2000 standard proposal. Elements of the structure shown in FIG. 4 correspond to functionally equivalent portions of the mobile station 12 shown in FIG. 2.

Figure 5:
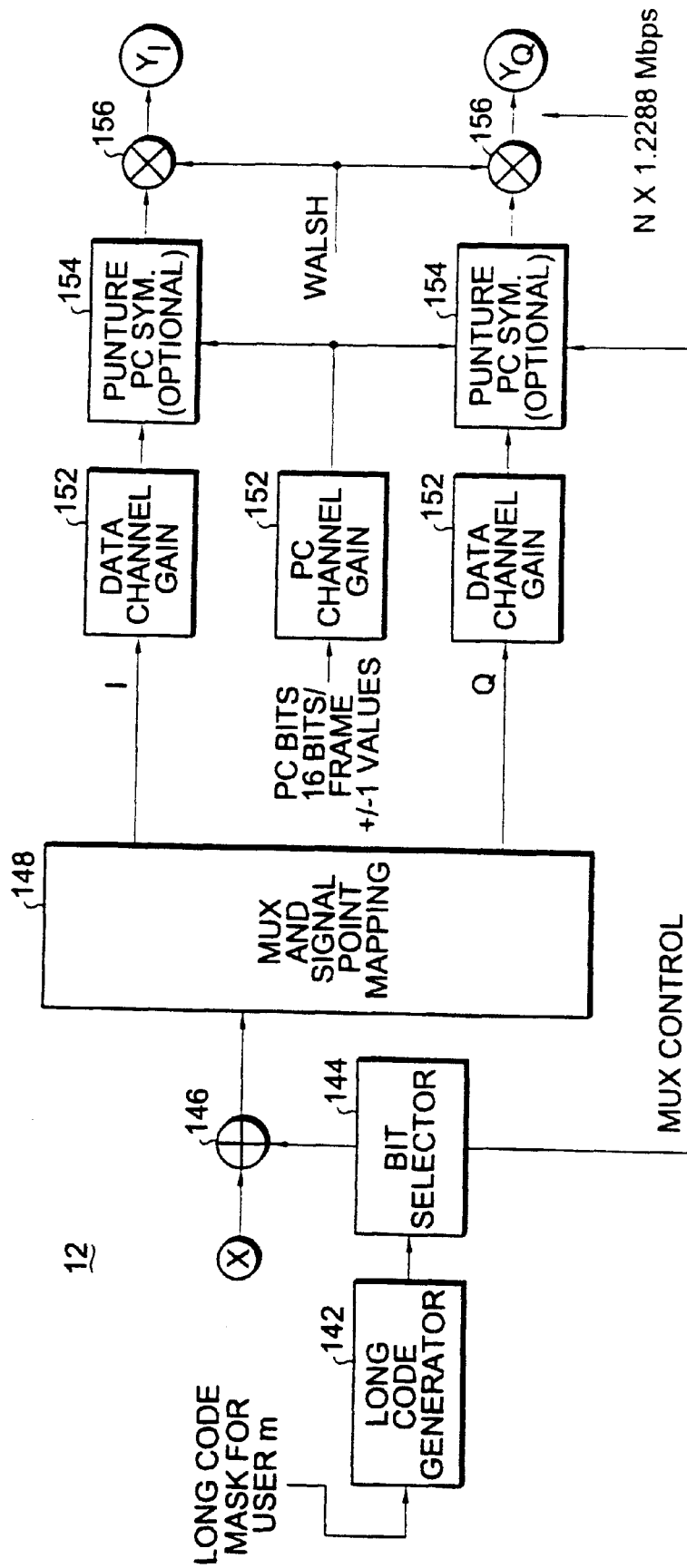
FIG. 5 illustrates a functional block diagram of another portion of the mobile station shown in FIG. 2.

FIG. 5 illustrates forward link channel structure which forms a portion of the transmit portion of a mobile station, such as the mobile station 12 shown in FIG. 2. Structure shown in the Figure includes a long code generator 142, a bit selector 144, a mixer 146, a multiplexer 148, gain elements 152, puncture symbols 154, and mixers 156 are used for Walsh encoding purposes.

Figure 6:
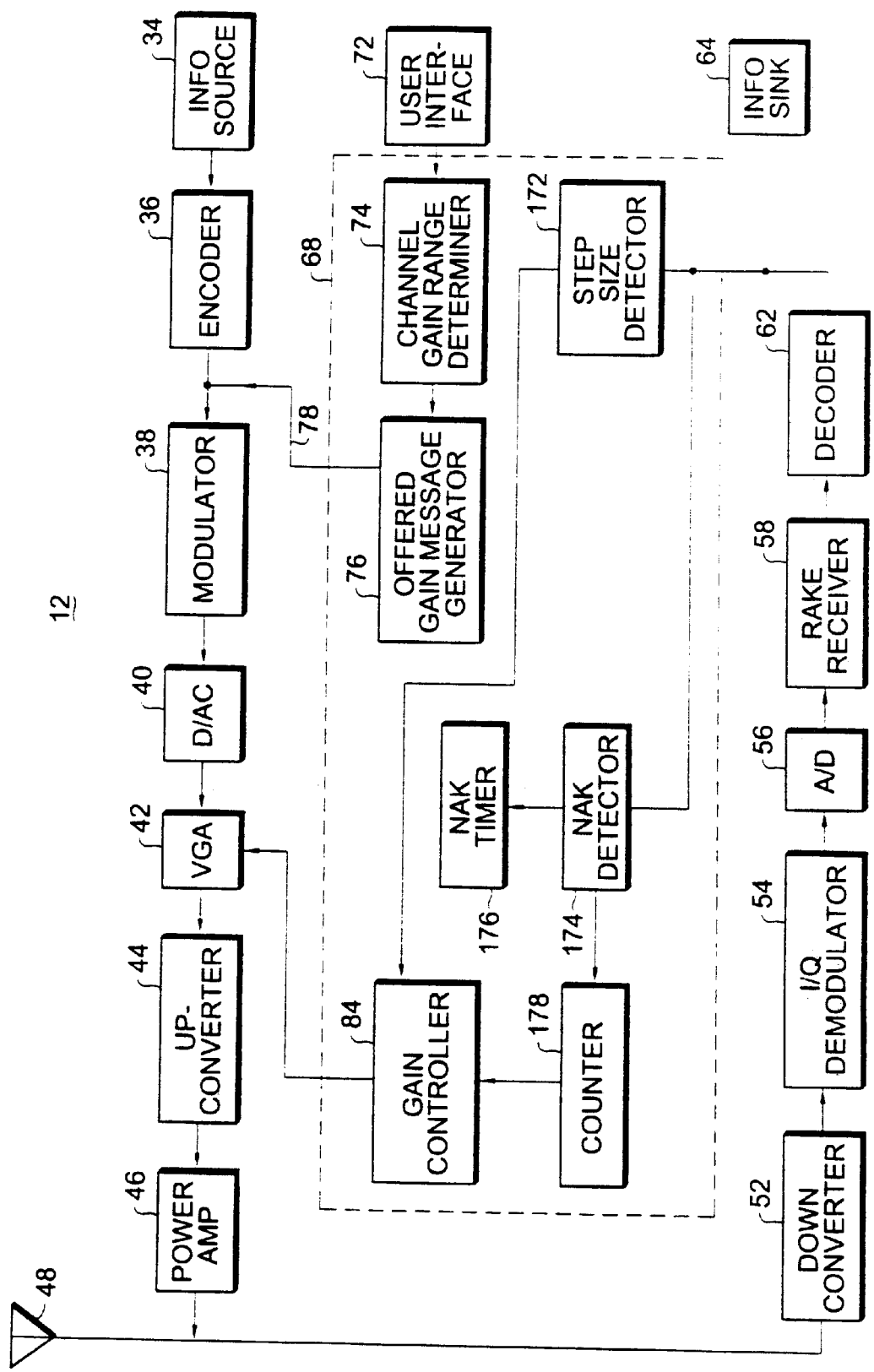
FIG. 6 illustrates a functional block diagram of a mobile station, similar to that shown in FIG. 2, but operable pursuant to an alternative embodiment of the present invention.

FIG. 6 illustrates the mobile station 12 of another embodiment of the present invention. The mobile station is again shown to include an information source 34, encoder 36, modulator 38, DAC 40, VGA 42, up-converter 44, and power amplifier 46. Signals generated by the transmit portion of the mobile station are again applied to an antenna transducer 48 to be transduced into electromagnetic form thereat. And, the mobile station again includes a receive portion including a down-converter 52, an I/Q demodulator 54, an A/D converter 56, a rake receiver 58, a decoder 62, and an information sink 64.

In this embodiment, the controller 68 effectuates gain control even without the detection of a channel gain message transmitted thereto by the network infrastructure of the communication system. The controller 68 is, however, shown to be coupled to receive indications of user-generated inputs generated by way of the user interface 72. And, a channel range determiner 74 is again operable to determine a range of channel gains to permit effectuation of performance of a communication service at a selected QoS level. Determinations made by the determiner are applied again to an offered gain message generator 76 which forms an offered gain message which is provided to the transmit portion of the mobile station on line 78 and used during service negotiations by the mobile station. An RLP (radio link protocol) formatting scheme is utilized to format data which is communicated to perform the communication service. In conventional manner, ACK (acknowledge) or NAK (no acknowledge) indications are sent back to the mobile station by the network infrastructure to indicate receipt or non-receipt of the RLP frames. The mobile station is provided with information pertaining to an NAK interval, a time period in which to sum NAK indications received at the mobile station, information related to an NAK limit, the maximum number of NAKs permitted during the NAK interval, and information related to a QoS step level, the nominal power step size in a dB, to alter channel gain on the channels upon which the signals are transmitted to perform the communication service. In an exemplary implementation, such information is sent to the mobile station by the network infrastructure in the form of RLP-related, layer three messages. The NAK interval and the NAK limit may be combined into a single message. In one implementation, the values of the NAK interval, the NAK limited, and the QoS step size are user-specific, in another implementation, such values are, instead, system parameters and transmitted to the mobile station over a common control channel.

Here, the controller 68 is further shown to include a step-size detector 172 coupled to the receive portion of the mobile station to detect indications of the QoS step transmitted to the mobile station. An NAK detector 174 is also coupled to the receive portion of the mobile station to detect the NAK information, i.e., the NAK interval and the NAK limit, transmitted to the mobile station. Indications of the NAK interval are provided to an NAK timer 176, and indications of the NAK limit are provided to a counter 178.

During operation, the counter is operable to count the number of NAKs within the time interval of the NAK interval and timed by the NAK timer. If the counter counts-out, an indication is provided to a gain controller 84. The gain controller is also coupled to receive indications of the QoS step size detected by the detector 172. Responsive thereto, the gain controller generates signals to control the amplification of the VGA 42. Thereby, a rule-of-thumb gain control is effectuated at the transmit portion of the mobile station upon receiving negative acknowledgment for a selected number of RLP data frames within a selected time.

Figure 7:
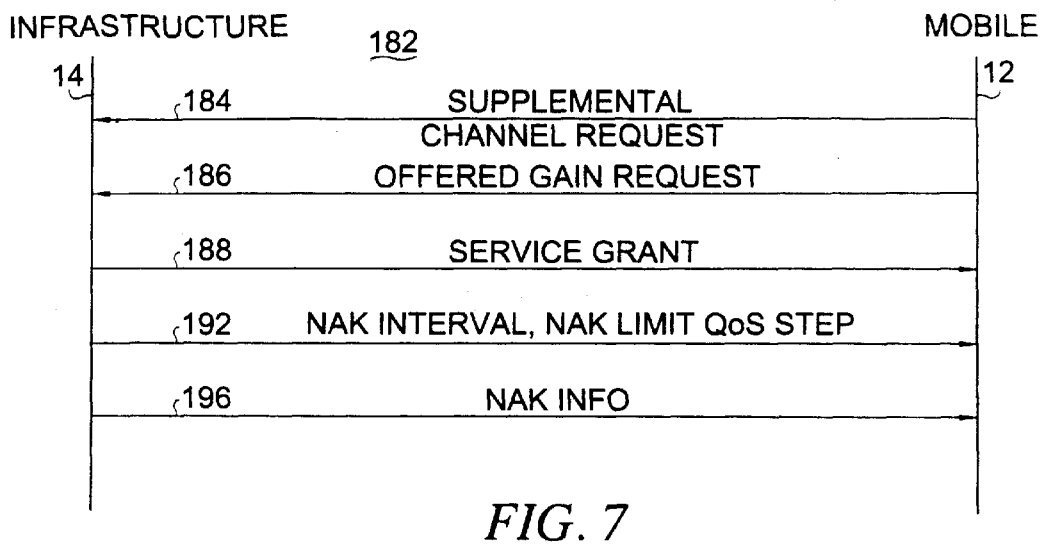
FIG. 7 illustrates a sequence diagram illustrating the sequence of signals generated during operation of an embodiment of the present invention.

FIG. 7 illustrates a sequence diagram, shown generally at 182, listing the signaling between the mobile station 12 and the network infrastructure, including a radio base station 14, during operation of an embodiment of the present invention. When a communication service is to be performed by the mobile station, the mobile station generates a supplemental channel request, indicated by the line 184, which is transmitted to the network infrastructure in which additional system resources are requested to be allocated to perform the communication service. An offered gain request, including the offered gain message generated by the offered gain message generator 76, shown in FIG. 6 to form a portion of the mobile station, is also sent, as indicated by the line 186, by the mobile station to the network infrastructure.

The network infrastructure, responsive to the requests, grants service by way of a service grant indicated by the line 188, granting service to the mobile station to perform the communication service. An NAK information message, including the NAK interval and the NAK limit, is also transmitted by the network infrastructure to the mobile station as indicated by the line 192. And, the network infrastructure sends a message containing the QoS step size, indicated by the line 194 to the mobile station. Thereafter, during communication of the RLP formatted frames of data, NAK information, indicated by the line 196, is provided by the network infrastructure to the mobile station. Gain control is effectuated therefrom.

Figure 8:
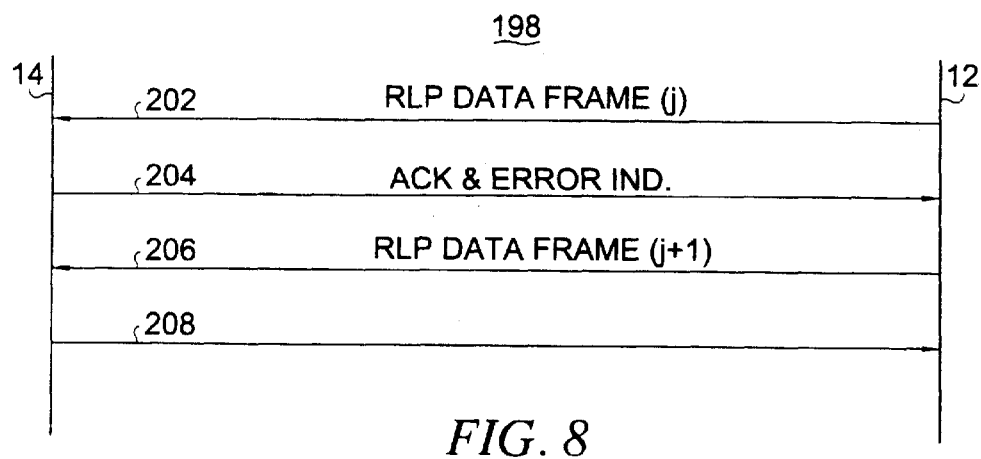
FIG. 8 illustrates a sequence diagram illustrating the signal sequences during operation of another embodiment of the present invention.

FIG. 8 illustrates a sequence diagram 198 representative of exemplary operation of a further embodiment of the present invention. The embodiment represented by the sequence diagram 198 provides RLP-based power control used to improve the reliability of retransmissions in an RLP (radio link protocol) application of a CDMA2000 cellular communication system. During operation of the power control effectuated in this embodiment, RLP retransmissions on a reverse link extending from the mobile station to the network infrastructure are power-controlled by adjusting a traffic channel gain by a specified step-size so as to improve the signal-to-noise ratio (SNR) of retransmissions received at the network infrastructure. Operation of the embodiment provides a manner by which to effectuate outer loop power control for a CDMA2000, or other radio communication, system.

An existing manner provides an algorithm by which to effectuate outer loop power control by selectively causing a step-size increase or decrease in subsequently-transmitted RLP data frames responsive to whether a previously-transmitted data frame is in error. One existing proposal, for instance, attempts to ensure that signal-to-noise ratios of RLP data frames received at a base station is of a level such that a required FER (frame error rate) is maintained. However, such existing power control method does not adequately account for values of FER which do not equal 10 (exp)—L where L is an integer greater than zero.

An embodiment of the present invention provides a manner by which better to effectuate power control in which amplification levels of which RLP data frames are amplified at levels responsive to the receipt of indications at the mobile station as to whether a previously-transmitted RLP data frame was, or was not, received in error at the network infrastructure. Such operation is stated in an algorithmic form as follows:

$$\frac{round(10^T F)}{10^T} - F = 0$$

wherein:

For frame j, j=0,1, . . . , adjust target $E_b/N_t$, denoted as Traffic $(E_b/N_t)_T$, using fixed step-size $\Delta$ 1. If the frame is in error, $(E_b/N_t)_T(j+1)=(E_b/N_t)_T(j)+(10^T-\text{round}(10^T F))\Delta$ 2. If the frame is not in error, $(E_b/N_t)_T(j+1)=(E_{b/Nt})_T(j)-\text{round}(10^T F)\Delta$; and T is an integer;

F is a target frame error rate (FER); and $\Delta$ is a value of a step-size.

When RLP-based power control is used, retransmissions of data frames usually arrive at a slightly better FER than the target F. However, outer loop power control should maintain a target FER for regular transmission frames in the presence of RLP retransmissions. To minimize the need to modify normal outer loop power control operation, operation of this embodiment of the present invention utilizes an algorithm as follows:

For frame j, j=0,1, . . . , adjust target Traffic $E_b/N_t$, denoted as $(E_{b/Nt})_T$, using fixed step-size $\Delta$ 1. If frame in error, $(E_b/N_t)_T(j+1)=(E_b/N_t)_T(j)+(10^T-\text{round}(10^T F))\Delta$ 2. If frame not in error and frame is not an RLP retransmission, $(E_b/N_t)_T(j+1)=(E_b/N_t)_T(j)-\text{round}(10^T F)\Delta$ 3. If frame not in error and frame is an RLP retransmission, $(E_b/N_t)_T(j+1)=(E_b/N_t)_T(j)$ The sequence diagram 198 indicates that first, an RLP data frame, the jth data frame, is communicated by the mobile station to the network infrastructure, indicated by the line segment 202. Then, as indicated by the segment 204, an acknowledgment and error indication is returned from the network infrastructure to the mobile station. Then, the gain at which a subsequent, the j+1, data frame is communicated by the mobile station to the network infrastructure is selectively modified by the above-noted algorithm, the subsequent transmission of the data frame is indicated by the line segment 206. Thereby, operation provides a power control scheme in which, if an RLP retransmission is successfully received at the network infrastructure, an outer loop subpoint is not adjusted. Otherwise, adjustment is made, as indicated in the algorithm. The calculations of the algorithm can be carried out by a gain controller, such as that which forms portions of the mobile station shown in preceding Figures. A gain control signal generated by the gain controller is then utilized by a variable gain amplifier of the transmit portion of the mobile station to effectuate the power control.

Figure 9:
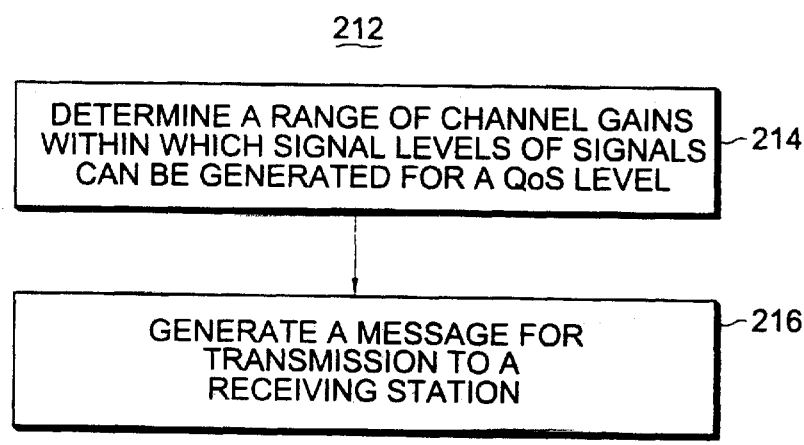
FIG. 9 illustrates a method flow diagram listing the method of operation of an embodiment of the present invention.

FIG. 9 illustrates a method, shown generally at 212, of an embodiment of the present invention. The method initiates effectuation of power control over signals generated by a radio device operable in the communication system. The signals are transmitted upon a radio channel to a receiving station to perform a communication service.

First, and as indicated by the block 214, a range of channel gains is determined within which signal levels of the signals can be generated by the radio device to permit performance of the communication service at a selected QoS level. Then, and as indicated by the block 216, a message is generated for transmission to the receiving station requesting allocation of channel capacity upon the radio channel to transmit signals upon the radio channel to perform the communication service. By determining the channel gain required to effectuate the communication service at a selected QoS level, maintenance of communications at the selected QoS level is better assured.

The previous descriptions are of preferred examples for implementing the invention, and the scope of the invention should not necessarily be limited by this description. The scope of the present invention is defined by the following claims:

We claim:

1. In a radio device operable in a communication system to perform a communication service, an improvement of apparatus for initiating effectuation of power control of signals generated by the radio device for transmission upon a radio channel to a receiving station to perform the communication service, said apparatus comprising:
   a channel gain range determiner coupled at least to receive indications of the communication service to be performed by the radio device, said channel gain range determiner for determining a range of channel gains within which signal levels of the signals generated by the radio device permit performance of the communication service; and
   a message generator coupled to receive determinations of said channel gain range determiner, said message generator for generating a message for transmission to the receiving station requesting allocation of channel capacity upon the radio channel to transmit signals upon the radio channel to perform the communication service.

2. The apparatus of claim 1 wherein the radio device includes a digital-to-analog converter and wherein determinations made by said channel gain range determiner include determinations of maximum gain levels by which to amplify the signals generated at the radio device without saturating the digital-to-analog converter.

3. The apparatus of claim 2 wherein a boundary value of the range of channel gains determined by said channel gain range determiner is determined responsive, in part, to determinations of the maximum gain levels by which to amplify the signals generated at the radio device without saturating the digital-to-analog converter.

4. The apparatus of claim 1 wherein the radio device comprises a mobile station operable in a cellular communication system, wherein the receiving station comprises a portion of network infrastructure of the cellular communication system, and wherein said message generator generates the message for transmission to the portion of the network infrastructure pursuant to service negotiations to request service in the cellular communication system.

5. The apparatus of claim 4 wherein the cellular communication system comprises a CDMA2000-compliant system and wherein the message generated by said message generator comprises an offered gain message.

6. The apparatus of claim 1 wherein the receiving station comprises a transceiving station for transmitting indications of service request grants granting communication system resources to the radio device to perform the communication service at selected power levels and wherein said apparatus further comprises a detector for detecting the indications transmitted by the transceiving station.

7. The apparatus of claim 6 further comprising a gain controller coupled to receive indications of detections made by said detector of the indications of the service request grants transmitted by the transmitting station, said gain controller for generating gain control signals responsive thereto.

8. The apparatus of claim 7 wherein the radio device comprises a transmitter portion having a variable gain amplifier, and wherein the gain control signal generated by said gain controller is applied to the variable gain amplifier to control gain levels thereof.

9. The apparatus of claim 7 wherein the radio device comprises a mobile station operable in a cellular communication system, wherein the transceiving station comprises a portion of network infrastructure of the cellular communication system, and wherein the indications of the service request grants transmitted by the network infrastructure are transmitted pursuant to service negotiations to request service to perform the communication service in the cellular communication system.

10. The apparatus of claim 9 wherein the cellular communication system comprises a CDMA2000-compliant system and wherein the message generated by said message generator comprises a channel gain message.

11. The apparatus of claim 1 wherein the receiving station comprises a transceiving station further for transmitting no-acknowledgment (NAK) information to the radio device, the NAK information for indicating to the radio device a manner by which to adjust power levels of signals generated by the radio device to perform the communication service and wherein said apparatus further comprises a detector for detecting indications of the NAK information transmitted to the radio device.

12. The apparatus of claim 11 wherein the radio device generates radio link protocol (RLP) data frames, and wherein said apparatus further comprises a gain controller for generating a gain control signal of a value responsive to NAK indications subsequent to generation of the RLP data frames in the manner indicated by the NAK information.

13. The apparatus of claim 12 wherein the NAK information comprises an NAK interval value representative of a time period during which the NAK indications are counted and wherein said apparatus further comprises a timer for timing the time period of which the NAK interval is representative.

14. The apparatus of claim 13 wherein the NAK information comprises an NAK limit value representative of a maximum number of NAK indications permitted within the time period of which the NAK interval value is representative and wherein said apparatus further comprises a counter for counting NAK indications.

15. The apparatus of claim 12 wherein the NAK information comprises a quality of service (QoS) step value representative of gain adjust step levels by which the value of the gain control signal is to be selectively adjusted subsequent to the generation of the RLP data frames.

16. The apparatus of claim 1 wherein the range of channel gains determined by said channel gain range determiner includes a lower boundary representative of at least a minimum gain level to ensure performance of the communication service at a selected QoS level.

17. The apparatus of claim 1 wherein the radio device generates radio link protocol (RLP) data frames, wherein the receiving station comprises a transceiving station further for transmitting to the radio device indications, responsive to reception of each RLP data frame at the transceiving station, whether the RLP data frame is received with error or without error, and wherein said apparatus further comprises a detector for detecting the indications transmitted by the transceiving station of whether the RLP data frame is received with error or without error.

18. The apparatus of claim 17 further comprising a gain controller coupled to be provided with the indications transmitted by the transceiving station of whether the RLP data frame is received with error or without error, said gain controller for generating a gain control signal responsive thereto, the gain control signal of a value for causing values of a signal-to-noise ratio $(E_nN_t)_T$, of a subsequently transmitted RLP data frame if the RLP data frame is received with error according to the equation:

$$(E_b/N_t)_T(j+1)=(E_b/N_t)_T(j)+(10^{-T}-\text{round }(10^T F)\Delta)$$

wherein:

j is an integer which identifies a frame number;

T is an integer;

F is a value of a target frame error rate; and

Δ is a fixed step-size value.

19. The apparatus of claim 18 wherein the gain control signal is of a value for causing values of the signal to-noise ratio $(E_b/N_t)_T$, of the subsequently transmitted RLP data frame if the RLP data frame is received without error and the RLP data frame is not a retransmission according to the equation:

$$(E_b/N_t)_T(j+1)=(E_b/N_t)_T(j)-\text{round }(10^T F)\Delta$$

20. The apparatus of claim 19 wherein the gain control signal is of a value for causing values of the signal-to-noise ratio $(E_b/N_t)_T$, of the subsequently transmitted RLP data frame is received without error and the RLP data frame is a retransmission according to the equation:

$$(E_b/N_t)_T(j+1)=(E_b/N_t)_T(j)$$

21. Mobile station apparatus for initiating effectuation of power control of signals generated at a mobile station upon a radio channel to network infrastructure to perform a communication service by way of a cellular communication system, said mobile station apparatus comprising:

a channel gain range determiner coupled at least to receive indications of the communication service to be performed by the mobile station, said channel gain determiner for determining a range of channel gains within which signal levels of the signal generated by the mobile station permit performance of the communication service at least at a selected QoS level; and a message generator coupled to receive determinations made by said channel gain range determiner, said message generator for generating a message for transmission to the network infrastructure requesting allocation of channel capacity upon the radio channel to transmit signals upon the radio channel to perform the communication service.

22. A method for initiating effectuation of power control of signals generated by a radio device operable in a communication system for transmission upon a radio channel to a receiving station to perform a communication service, said method comprising:

determining a range of channel gains within which signal levels of the signals generated by the radio device permit performance of the communication service; and generating, responsive to determinations made during said operation of determining, a message for transmission to the receiving station requesting allocation of channel capacity upon the radio channel to transmit signals upon the radio channel to perform the communication service.

23. The method of claim 22 comprising the additional operation of transmitting back to the radio device indications of service request grants granting communication system resources to the radio device to perform the communication device at selected power levels responsive to the message generated during said operation of generating.

24. The method of claim 22 comprising the additional operation of transmitting back to the radio device NAK information, the NAK information for indicating to the radio device a manner by which to adjust power levels of signals generated by the radio device to perform the communication service.

25. Gain control apparatus for a radio device operable in a two-way radio communication system to communicate RLP data frames to a remote transceiving station, the remote transceiving station operable at least to return indications, responsive to reception of each RLP data frame at the transceiving station, whether the RLP data frame is received with error or without error, said gain control apparatus for causing a signal-to-noise ratio $(E_b/N_t)_T$, of a subsequently transmitted RLP data frame to be of a selected value, said gain control apparatus comprising:

a variable gain amplifier element for amplifying the RLP data frames prior to communication thereof by the radio device, said variable gain amplifier element exhibiting an amplification level selectable responsive to values of a gain control signal applied thereto; and a gain controller coupled to receive the indications returned by the transceiving station of whether the RLP data frame is received with error or without error, said gain controller for generating the gain control signal applied to said variable gain amplifier, the gain control signal of a value for causing values of a signal-to-noise ratio $(E_b/N_t)_T$, of a subsequently communicated RLP data frame is received with error according to the equation:

$$(E_b/N_t)_T(j+1)=(E_b/N_t)_T(j)+(10^{-T}-\text{round }(10^T F)\Delta)$$

wherein:

j is an integer which identifies a frame number;

T is an integer;

F is a value of a target frame error rate; and

Δ is a fixed step-size value.

* * * * *